(12) United States Patent
Jablonsky (10) Patent No.: US 11,421,431 B1
(45) Date of Patent: Aug. 23, 2022

(54) ERECTION ANCHOR WITH COIL LEGS

(71) Applicant: ALP Supply, Inc., Fairless Hills, PA (US)

(72) Inventor: David S. Jablonsky, Washington Crossing, PA (US)

(73) Assignee: ALP Supply, Inc., Fairless Hills, PA (US)

( * ) Notice: Subject to any disclaimer, the term of this patent is extended or adjusted under 35 U.S.C. 154(b) by 83 days.

(21) Appl. No.: 16/797,139

(22) Filed: Feb. 21, 2020

Related U.S. Application Data (60) Provisional application No. 62/808,537, filed on Feb. 21, 2019.

(51) Int. Cl.
| | | |
|---|---|---|
| *E04G 21/14* | (2006.01) | |
| *E04C 2/288* | (2006.01) | |
| *B32B 13/04* | (2006.01) | |
| *B32B 3/08* | (2006.01) | |
| *E04C 2/00* | (2006.01) | |

(52) U.S. Cl.
CPC .............. *E04G 21/142* (2013.01); *B32B 3/08* (2013.01); *B32B 13/04* (2013.01); *E04C 2/288* (2013.01); *B32B 2250/03* (2013.01); *B32B 2250/40* (2013.01); *B32B 2419/00* (2013.01); *E04C 2002/002* (2013.01)

(58) Field of Classification Search
CPC ... E04B 1/4107; E04B 1/4157; E04G 21/142; E04G 15/04; E04C 2002/002; E04C 2/288; B66C 1/666; B28B 23/005
See application file for complete search history.

(56) References Cited

U.S. PATENT DOCUMENTS

| | | | |
|---|---|---|---|
| 1,045,587 A | | 11/1912 | Morley |
| 1,726,286 A | * | 8/1929 | Bennet ................ E04B 1/4157 411/965 |
| 2,137,718 A | | 11/1938 | Friberg |
| 2,344,206 A | | 3/1944 | Forni |
| 2,772,560 A | * | 12/1956 | Neptune ................ E04C 5/167 52/707 |
| 2,794,336 A | | 6/1957 | Ballou |
| 2,962,839 A | | 12/1960 | Carlson |
| 3,375,795 A | | 4/1968 | Merkle, Jr. |
| 3,534,668 A | | 10/1970 | Scheincha |
| 3,626,648 A | | 12/1971 | Beckham |
| 3,705,469 A | | 12/1972 | Eriksson |

(Continued)

FOREIGN PATENT DOCUMENTS

| | | |
|---|---|---|
| DE | 29914235 U1 | 11/1999 |
| EP | 3029220 A1 | 6/2016 |
| FR | 2184303 A5 | 12/1973 |

*Primary Examiner* — Gisele D Ford
(74) *Attorney, Agent, or Firm* — Timothy J. Monahan; Monahan & Company, LLC (57) ABSTRACT

An erection anchor is provided having a head and first and second legs affixed to opposite sides of the head, whereby the first and second legs each have a threaded lower section extending downward, away from the head. The erection anchor may be embedded in a precast concrete panel, such as a multilayer panel having an insulation core layer sandwiched between concrete layers. The erection anchor may be embedded in the multilayer panel with the head exposed and the first and second legs each embedded in a concrete layer on opposite sides of the insulation layer.

20 Claims, 6 Drawing Sheets

(56) References Cited

U.S. PATENT DOCUMENTS

| | | | | |
|---|---|---|---|---|
| 3,916,590 | A | 11/1975 | Miller | |
| 3,977,344 | A | 8/1976 | Holford | |
| 4,262,951 | A | 4/1981 | Hoyer | |
| 4,443,980 | A | 4/1984 | Pennypacker | |
| 4,526,739 | A * | 7/1985 | Migliacci | B28B 23/04 249/177 |
| 4,531,861 | A | 7/1985 | Kash | |
| 4,563,110 | A | 1/1986 | Langenbach, Jr. | |
| 4,615,554 | A | 10/1986 | Schilla et al. | |
| 4,634,164 | A | 1/1987 | Fricker | |
| 4,702,045 | A | 10/1987 | Fricker | |
| 5,004,208 | A | 4/1991 | Domizio | |
| 5,050,364 | A | 9/1991 | Johnson et al. | |
| 5,226,265 | A | 7/1993 | Kelly et al. | |
| 5,402,609 | A | 4/1995 | Kelley, Jr. | |
| 5,596,846 | A | 1/1997 | Kelly | |
| 5,651,642 | A | 7/1997 | Kelley, Jr. | |
| 5,732,991 | A | 3/1998 | Tsui | |
| 6,286,270 | B1 * | 9/2001 | Gruson | E04C 5/12 52/156 |
| 6,848,864 | B1 | 2/2005 | Davie, Jr. et al. | |
| 7,111,432 | B2 | 9/2006 | Hansort | |
| D645,731 | S | 9/2011 | Williams | |
| 8,381,482 | B2 | 2/2013 | Lin et al. | |
| 8,397,464 | B2 | 3/2013 | Lin | |
| 8,695,287 | B1 | 4/2014 | Francies, III | |
| 8,898,964 | B1 | 12/2014 | Francies, III | |
| 9,097,001 | B2 | 8/2015 | Espinosa | |
| 9,151,065 | B1 | 10/2015 | Francies, III | |
| 2002/0083658 | A1 | 7/2002 | Dial, Jr. | |
| 2003/0141576 | A1 | 7/2003 | Sanfleben | |
| 2005/0044811 | A1 | 3/2005 | Hansort | |
| 2005/0055956 | A1 * | 3/2005 | Hardy | E04B 1/4157 52/698 |
| 2006/0070337 | A1 * | 4/2006 | Fouch | E04B 1/4157 52/712 |
| 2007/0059102 | A1 | 3/2007 | Beach et al. | |
| 2008/0196324 | A1 | 8/2008 | Mackay Sim | |
| 2009/0205268 | A1 * | 8/2009 | Fletcher | E04G 21/142 52/125.4 |
| 2009/0320386 | A1 | 12/2009 | Mackay Sim | |
| 2010/0000175 | A1 | 1/2010 | Johnson et al. | |
| 2010/0058677 | A1 | 3/2010 | Arteon | |
| 2010/0107545 | A1 * | 5/2010 | Montague | E04B 1/4157 52/699 |
| 2012/0055114 | A1 * | 3/2012 | Roulston | F16M 9/00 52/742.15 |
| 2012/0304554 | A1 | 12/2012 | Sladojevic | |
| 2013/0091785 | A1 * | 4/2013 | Sladojevic | E04G 21/147 52/125.4 |
| 2013/0139451 | A1 * | 6/2013 | Sladojevic | E04G 21/147 52/125.4 |
| 2013/0174499 | A1 * | 7/2013 | Densmore | E04G 21/142 52/125.4 |
| 2015/0075090 | A1 * | 3/2015 | Barraclouch | E04G 21/142 52/125.4 |
| 2018/0058081 | A1 | 3/2018 | Hansort | |

* cited by examiner

ERECTION ANCHOR WITH COIL LEGS

The present invention relates to anchors that are embedded in a precast concrete component, to facilitate lining the component. The erection anchor is useful for lifting concrete panels from a horizontal orientation to a vertical orientation and for raising a concrete panel vertically.

BACKGROUND OF THE INVENTION

Many buildings, parking garages, highway overpasses and other structures are assembled from precast concrete components. The components are typically manufactured at a first location and then transported to the construction site. To facilitate transportation and assembly, the precast concrete components are provided with anchors embedded in the concrete, which can be engaged by heavy equipment, such as cranes, to lift the components.

The precast concrete component may be a concrete panel, which is substantially planar in shape. The panel may be comprised of an insulation layer sandwiched between outer concrete layers. Various reinforcement materials may be incorporated in the precast concrete component, such as rebar, welded wire, and multi-ply cables, which may be pre-stressed or post-tensioned. Any anchor system should be compatible with the reinforcement material incorporated into the concrete.

Kelly—U.S. Pat. No. 5,596,846 discloses a lift anchor with an angle member 36 designed to transmit lifting force to the concrete slab, when the slab is lifted from a horizontal position to an upright position. Holes 24 and 26 accommodate tensioning bars inserted through the anchor.

Hansort—U.S. Pat. No. 7,111,432 B2 discloses a rectangular shaped lift anchor having a wedge shaped foot 48. In another embodiment of the invention shown in FIG. 10, the anchor includes openings 64 and 66, which accommodate tension bars 118, embedded in the concrete layers located on opposite sides of insulation layer 112.

Francies, III—U.S. Pat. No. 9,151,065 B1 discloses a lift anchor having head 24 with anchor legs 20 and 22 extending downward and terminating in forged feet 28 and 30, respectively. The forged feet may be notched to accommodate a tensioning strand positioned in the concrete component.

Despite the prior art developments, there remains a need for a lift anchor for concrete components that is relatively economical to manufacture, can accommodate both solid concrete panels as well as panels having an insulation layer sandwiched between concrete layers, and can be used with or without the addition of tensioning bars inserted through the head of the anchor.

SUMMARY OF THE INVENTION

The present invention includes an anchor designed for lifting a precast concrete component and a precast concrete component incorporating the anchor.

The erection anchor has head, which is characterized by a top, a first side and a second side. The head may be a slab of steel or other metal, with a hole extending through the body of the head, adjacent the top of the head. The hole provides a means for a hook, cable or other lifting connector to engage the erection anchor, when an operator desires to reposition the concrete component in which the anchor is embedded.

A first leg is provided and has an upper end connected to the first side of the head of the anchor, for example, by welding, and a lower end extending downward from the head. The lower end of the first leg is threaded. Similarly, a second leg is provided having an upper end connected to the second side of the head of the anchor and a lower end extending downward from the head. The lower end of the second leg is also threaded.

Each of the legs is provided with a series of threads along the lower end of its length. The threads are defined by a crest, representing the outermost distance from the center of the leg, also referred to as the major diameter, and a root or trough, representing the innermost distance from the center of the leg, also referred to as the minor diameter. The distance between the crest and the trough of a threaded section is referred to herein as the height of the thread. The distance between adjacent crests is the pitch.

The threads are designed to increase the load bearing capacity of the lift anchor by distributing stress along the length of each of the legs, rather than concentrating the load bearing force at one location. Furthermore, the streamlined profile of the anchor of the present invention is particularly useful for relatively thin sections of precast concrete components. The pitch, height of the threads and angle of the sides of the threads relative to the axis of the legs are selected to allow the concrete to flow into the gaps between the crests of the threads, thereby maximizing the strength of the material surrounding the anchor.

The threads may be characterized as a helical rib formed on the outside of the rod. The threads may be created along the lower ends of the length of each of the legs before the leg is bent, i.e. while the rod is straight. For example, the threads may be rolled threads or they may be cut threads. By way of example, the threads may be coil threads, acme threads, Unified Coarse threads (UNC) or Unified Fine threads (UFC). The threadform may be square, triangular, trapezoidal, or other shape. Of particular interest are coil threads having a threadform characterized by a concave arc extending between adjacent crests, which allow wet concrete to fully penetrate to the minor diameter of the leg, thereby ensuring that the leg is locked in place when the concrete sets.

The use of threads as the projections along the legs of the anchor opens the possibility to provide one, two, three or more nuts threaded on to the anchor, to increase the pull-out strength. By way of example, multiple nuts may be spaced out along each of the legs. The nuts may be fixed in place to maintain their position on the legs, prior to insertion in concrete, with an adhesive, such as a hot-melt adhesive, or by welding.

The legs of the erection anchor may be substantially parallel to each other, as the legs extend downward from the head. The width between the legs will depend upon the application, in particular, the thickness of a precast concrete panel. For example, the legs of the anchor may be oriented parallel to the sides of a panel, and the head may be oriented perpendicular to and straddle an insulation layer sandwiched between concrete layers, with the lower end of the first leg embedded in a concrete layer on a first side of the panel and the lower end of the second leg embedded in a concrete layer on an opposite side of the panel.

In another embodiment of the invention, the lower ends of the first and second legs of the anchor are not parallel to each other along their entire lengths. For example, the legs may diverge outwardly from each other as they extend downward from the head, and then curve inward, so that only the a portion of the lower ends of the first and second legs are substantially parallel, that is, the portion of the legs farthest from the head may be substantially parallel.

The erection anchor is often required to transmit lifting force in two directions, relative to a concrete component in which it is embedded. For example, an erection anchor embedded in a concrete panel must be capable of transmitting lifting force perpendicular to the side of the panel when raising the panel for a horizontal to an upright position, e.g. vertical. Additionally, the anchor must be capable of transmitting lifting force to the panel when the panel is raised, that is, suspended in midair. Optionally, the erection anchor may be provided with a shear member, for transmitting lifting force perpendicular to the longitudinal extent of the head and legs of the erection anchor, i.e. perpendicular to a side of a panel. The shear member may be a shear plate or shear bar affixed to or engaging the head of the anchor. Or the shear member may be a utility lift anchor, such as a forged foot utility lift anchor, affixed to the head or leg of the anchor, for example, by welding.

In use, the anchor is embedded in a precast concrete component. In particular, the legs are embedded in the concrete with the handle accessible to a hook or other lifting connector for raising the component. The handle may extend above the outer surface of the precast concrete component. Alternatively, the handle may be recessed, that is, below the outer surface of the surrounding concrete, with the hole in the head accessible to a lifting connector, which may be readily accomplished by using a recess form, as is well-known in the art. The anchor is inserted in the concrete, before the concrete sets in the form. The precast concrete component may also incorporate rebar, welded wire, or multi-ply cables, which may be pre-stressed or post-tensioned. Depending upon the shape and weight of the component, one, two, three, four, or more anchors may be embedded in the concrete component. By way of example, the concrete component is a precast panel, that is, a planar structure having a height and width substantially greater than its thickness. The planar structure may have an insulation layer at its core, that is, sandwiched between layers of concrete. The insulation layer be aerated concrete or other insulating material, as is known to those skilled in the art.

DETAILED DESCRIPTION OF THE INVENTION

Without intending to limit the scope of the invention, the preferred embodiments and features are hereinafter set forth. All of the United States patents and published applications cited in the specification are incorporated herein by reference.

Figure 1:
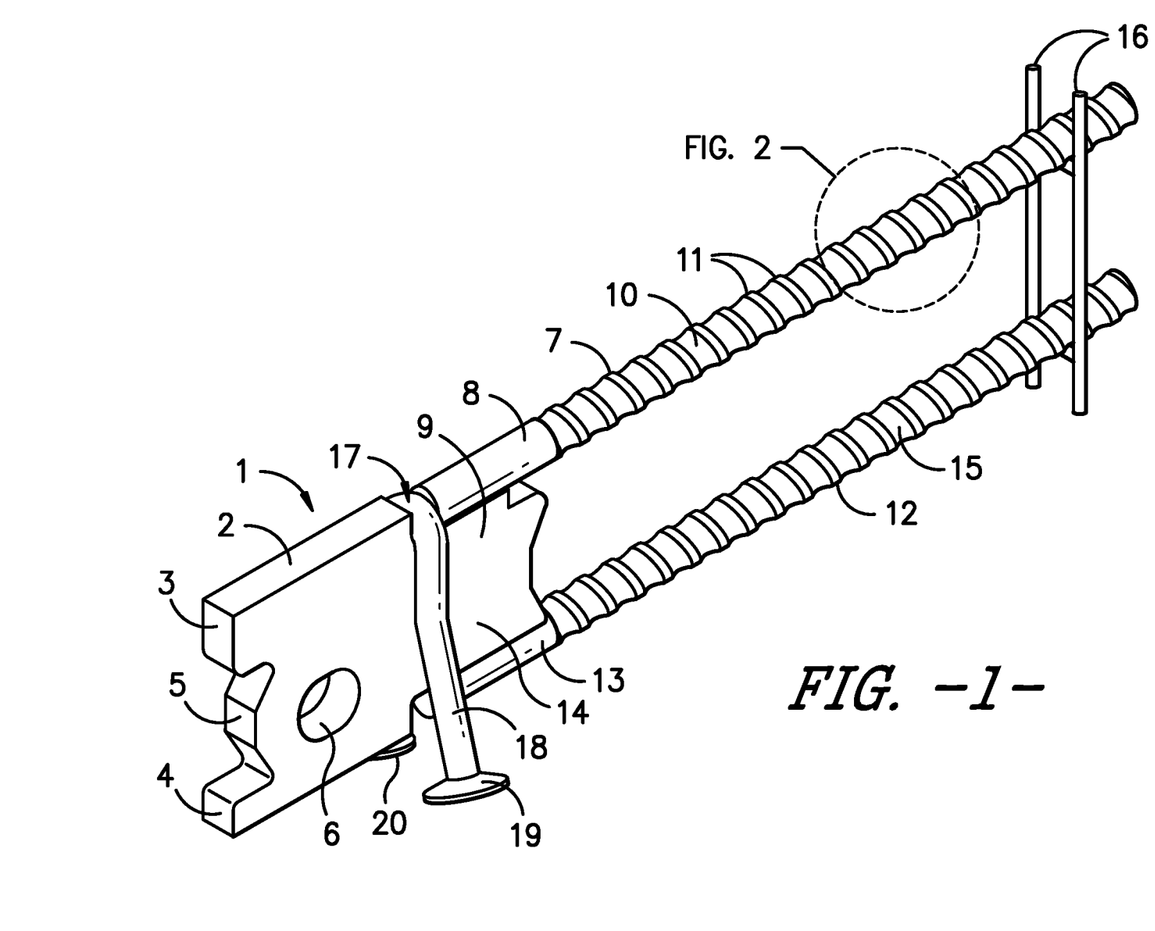
FIG. 1 is a perspective view of the erection anchor, prior to being embedded in a precast concrete component.

Referring to FIG. 1, anchor 1 has head 2, with ears 3 and 4 extending from the top 5 of head 2. Ears 3 and 4 prevent the clutch from coming in contact with and spalling the concrete in which the anchor is embedded. Hole 6 extends through the thickness of head 2 and is sized to engage a lifting clutch, hook, cable or other lifting connector attached to a crane, hoist or the like.

Leg 7 has upper end 8 affixed to side 9 of head 1, for example, by welding. Leg 7 has lower end 10 extending downward from head 1. Lower end 10 of leg 7 is provided with threads 11 along its length. Similarly, leg 12 has upper end 13 affixed to side 14 of head 1 and lower end 15 extending downward from head 1. Lower end 15 of leg 12 is provided with threads along its length, which may be the same as threads 11 of lower end 10 of leg 7. Legs 7 and 12 are in substantially parallel relation to each other.

Anchor 1 is optionally provided with guides 16, for aligning the anchor relative to reinforcing members, such as rebar, tensioning bars, strands or tensioning cables, extending through a precast concrete component. In the anchor illustrated in FIG. 1, guides 16 are bars affixed to lower end 10 of leg 7 and lower end 15 of leg 12, whereby the ends of guides 16 extend beyond legs 7 and 12, to engage a reinforcing member. By way of example, guides 16 may be located adjacent the terminal ends, i.e. the ends opposite head 1, of legs 7 and 12.

Anchor 1 is also provided with a shear member, which in the embodiment illustrated in FIG. 1 is utility lift anchor 17. Lift anchor 17 has a "U" shaped rod 18 affixed to side 9 of head 2, which terminates in forged feet 19 and 20.

Figure 2:
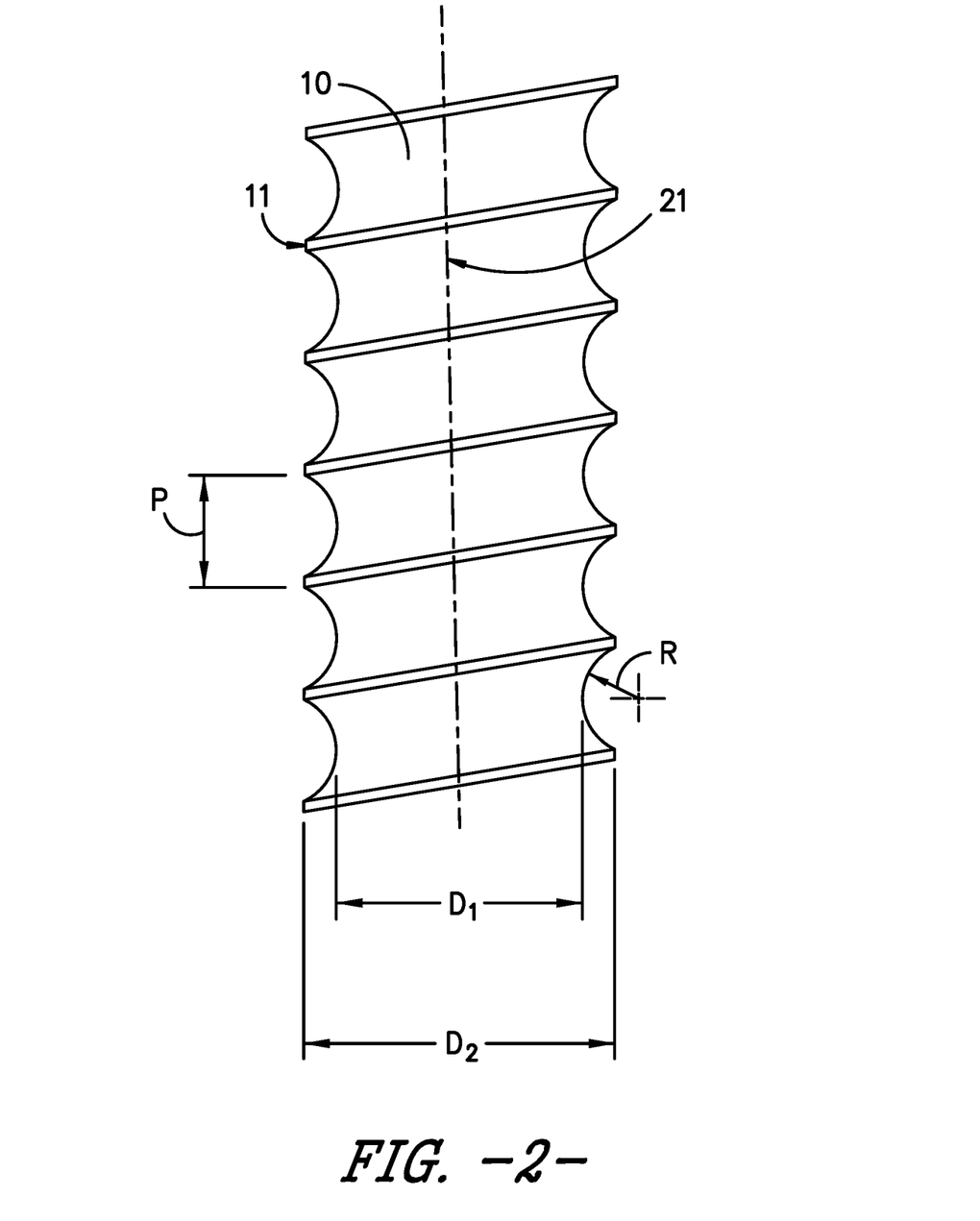
FIG. 2 is a magnified view of the section of a leg of the anchor shown in FIG. 1.

FIG. 2 shows a magnified view of a section of threads 11 of leg 7. Threads 11 may be coil threads and characterized by a pitch "P", the distance between the crests of the threads, a radius "R", the arc between adjacent crests of the threads of leg 7, and a major diameter $D_1$ and a minor diameter $D_2$ of the threads relative to the axis 21 of leg 7. By way of example, threads 11 of anchor 1 may have a pitch of from 3 mm to 100 mm, in particular from 7 mm to 30 mm, more particularly from 10 mm to 20 mm. The thread may have one, two, three or more starts. Radius R may range from 7 mm to 14 mm. By way of example, the threads or other series of projections along the legs of the lift anchor may be characterized by a major diameter and a minor diameter, in which the major diameter may be from 5% to 30% greater than the minor diameter. The depth of the threads or other projections may range from 1 mm to 10 mm, in particular from 1 mm to 3 mm, more particularly from 1.1 mm to 2 mm.

The overall length of anchor 1, as measured from ear 3 or 4 to the terminal ends of legs 7 and 12 will depend on the specific application, that is, the specification of the precast concrete component. For a typical concrete panel, the length will be approximately from 15 inches to 30 inches, but the overall dimensions of the anchor of the present invention is not limited. By way of example, the lower ends 10 and 15 of legs 7 and 12, respectively, of anchor 1 may be provided with threads or other projections along a length of 6" or greater, 10" or greater, or even 15" or greater, depending on the requirements of supporting a particular precast concrete component.

Figure 3:
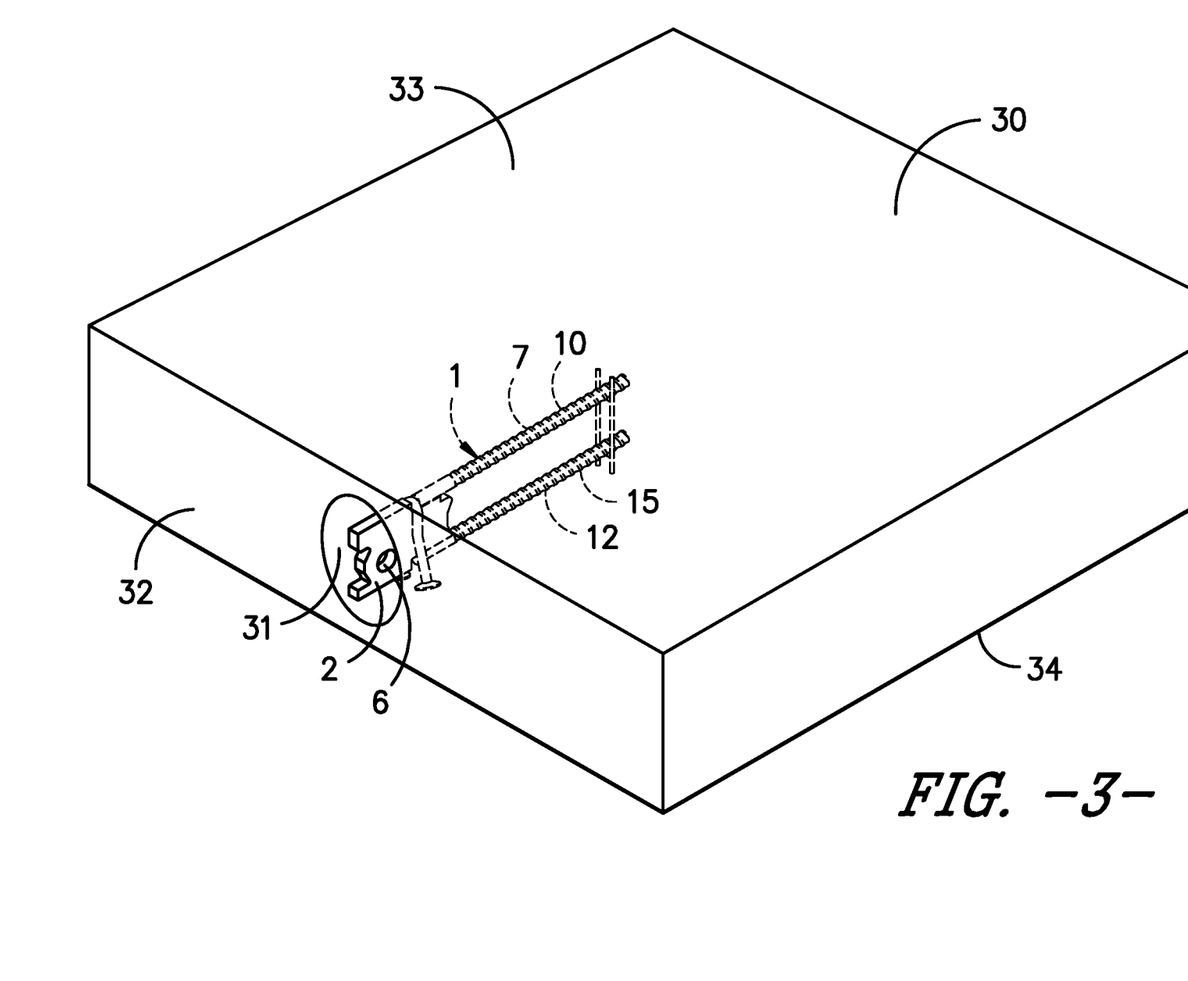
FIG. 3 is a perspective view of the anchor of FIG. 1 embedded in a precast concrete panel.

Referring to FIG. 3, anchor 1 is embedded in precast concrete slab 30. Recess 31 is provided in side 32 of slab 30 at the time the slab is cast, to allow a lifting connector to be inserted in hole 6 of head 2. The lower ends 10 and 15 of legs 7 and 12, respectively, are embedded in concrete slab 30. It can be seen that since legs 7 and 12 are substantially in parallel relation, the minimum distance between the legs and faces 33 and 34 of panel 30 are maintained.

Figure 4:
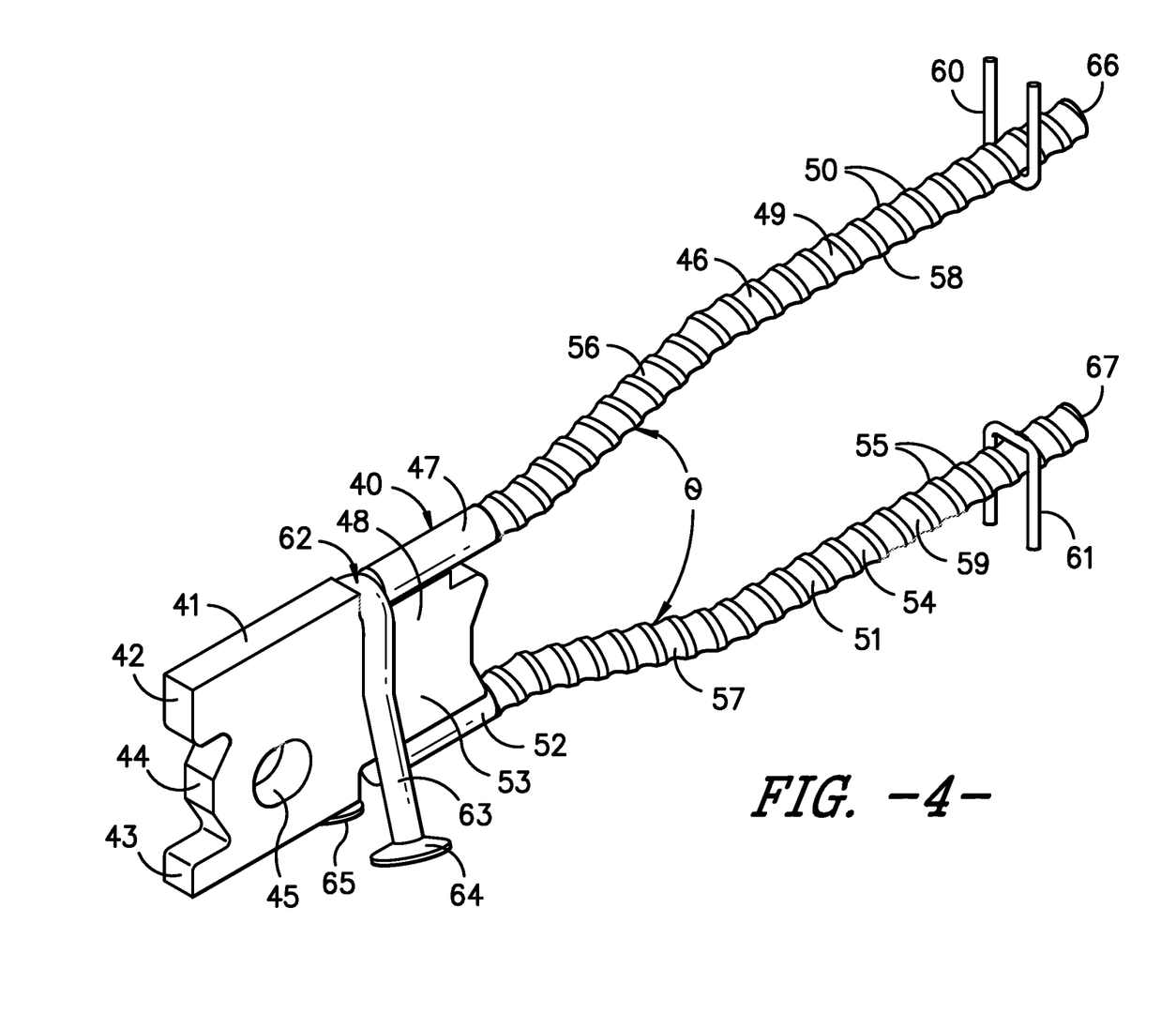
FIG. 4 is a perspective view of an alternative design of the anchor, in which the threaded legs are spread to straddle the insulation layer of a multilayer concrete-insulation-concrete panel.

FIG. 4 shows an alternative embodiment of the anchor of the present invention in which the threaded legs are spread apart for use in a precast concrete panel having a core of insulation. Anchor 40 has head 41 with ears 42 and 43 extending from the top 44 of head 41. Hole 45 extends through the thickness of head 41 and is sized to engage connection mechanism for raising a precast concrete component into the desired position.

Leg 46 has upper end 47 affixed to side 48 of head 41. Leg 46 has lower end 49 extending downward from head 41. Lower end 49 is provided with threads 50, which have the same range of characteristics as described with regard to anchor 1 in FIGS. 1 and 2. Similarly, leg 51 has upper end 52 affixed to side 53 of head 41 and lower end 54 extending downward away from head 41. Lower end 54 is provided with threads 55, which have the same range of characteristics as described with regard to anchor 1 in FIGS. 1 and 2.

A feature of legs 46 and 51 of anchor 40 is that the lower ends of the legs transition from a section wherein they diverge from each other, followed by a section wherein the legs return to a substantially parallel relationship. Legs 46 and 51 are provided with divergent sections 56 and 57, respectively, and represent the section of lower ends 49 and 54 that are closest to head 41. The angle between sections 56 and 57, shown as e in FIG. 4, may range from 5 to 45 degrees. When the desired spacing between legs 46 and 51 is obtained, the lower ends 49 and 54 transition to a parallel sections 58 and 59, respectively.

The spread of legs 46 and 51 may also be characterized by the change in (a) the distance between side 48 and side 53 of head 41 at the point of attachment of upper end 47 of leg 46 and the point of attachment of upper end 52 of leg 51, respectively, and (b) the interior distance between the terminal ends 66 and 67 of legs 46 and 51, respectively. In various embodiments of the invention, the distance between (a) and (b) increases 25% or more, 50% or more, or even 75% or more, as the legs transition from head 41 to terminal ends 66 and 67.

Legs 46 and 51 may optionally be provided with guides 60 and 61, respectively, which can function to engage a reinforcing member, as described with regard to guides 16 in anchor 1 of FIG. 1.

Anchor 40 is also provided with a shear member, which in the embodiment illustrated in FIG. 4 is utility lift anchor 62. Lift anchor 62 has a "U" shaped rod 63 affixed to side 48 of head 41, which terminates in forged feet 64 and 65.

Figure 5:
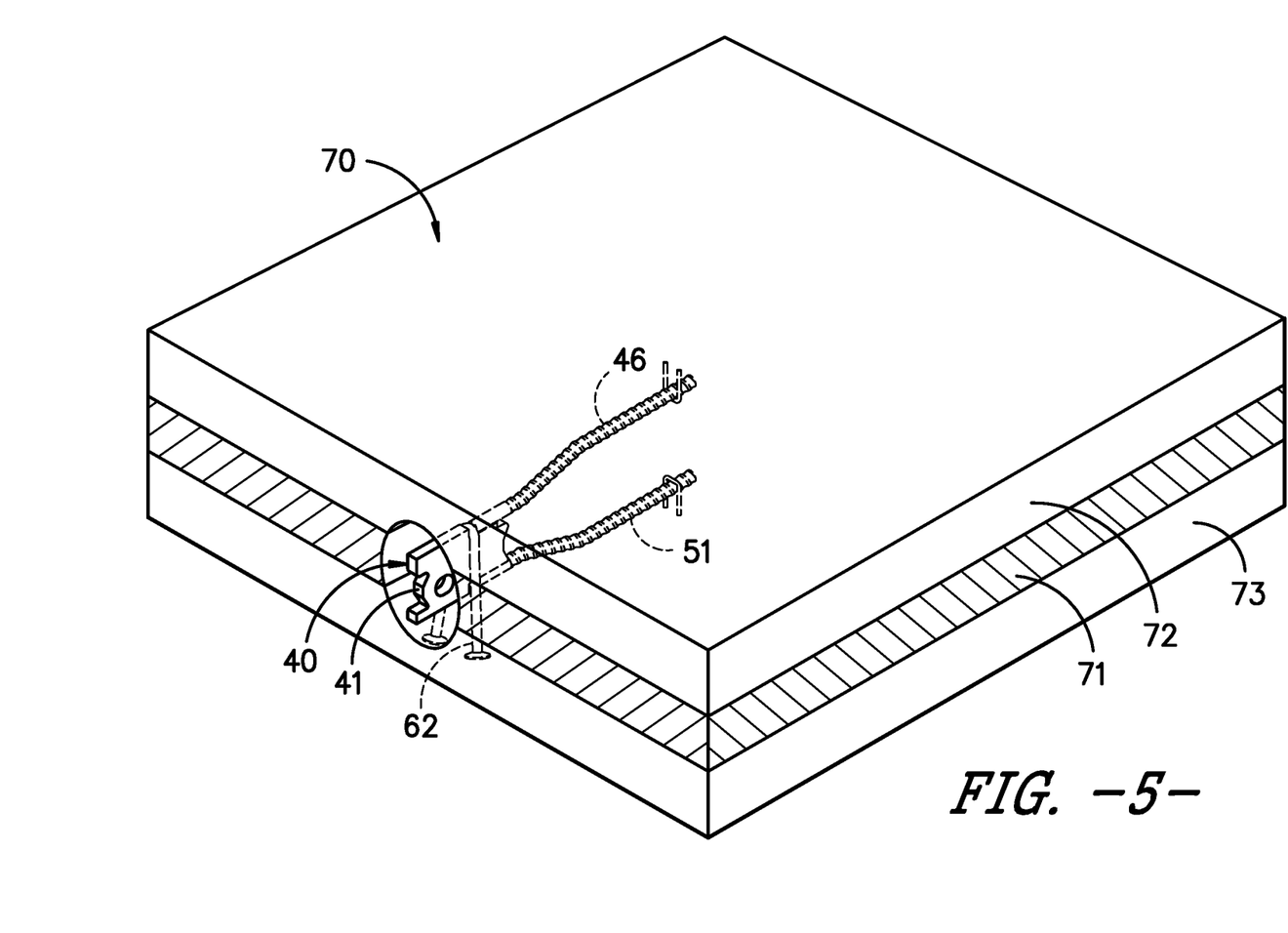
FIG. 5 is a perspective view of the anchor of FIG. 4 embedded in a multilayer precast concrete-insulation-concrete panel.

Referring to FIG. 5, precast concrete panel 70 is comprised of three layers—insulated core layer 71 and outer concrete layers 72 and 73. Anchor 40, which is illustrated in FIG. 4, is embedded in panel 70, with head 41 aligned vertically, i.e. perpendicular to the plane defined by panel 70. Lower end 49 of leg 46, in particular, parallel section 58 of leg 46, is embedded in concrete layer 72. Lower end 54 of leg 51, in particular, parallel section 59 of leg 51 is embedded in concrete layer 73. The shear member, lift anchor 62, extends into concrete layer 73. In particular, forged feet 64 and 65 are embedded in concrete layer 73. It can be understood that other shear members may be substituted for utility lift anchor 62, provided that the shear member engages head 41 and is at least partially embedded in concrete layer 72 or 73.

An advantage of the configuration of anchor 40 become apparent in multilayer precast concrete panels having an insulation core layer. The width of head 41 need not span the insulation core, in order to align tension bars in the concrete layers. Instead, legs 46 and 51 diverge outwardly from the sides of head 41, so that most of the threaded lower ends 49 and 54, respectively, are embedded in the concrete layers 72 and 73, on opposite sides of insulation core 71.

Figure 6:
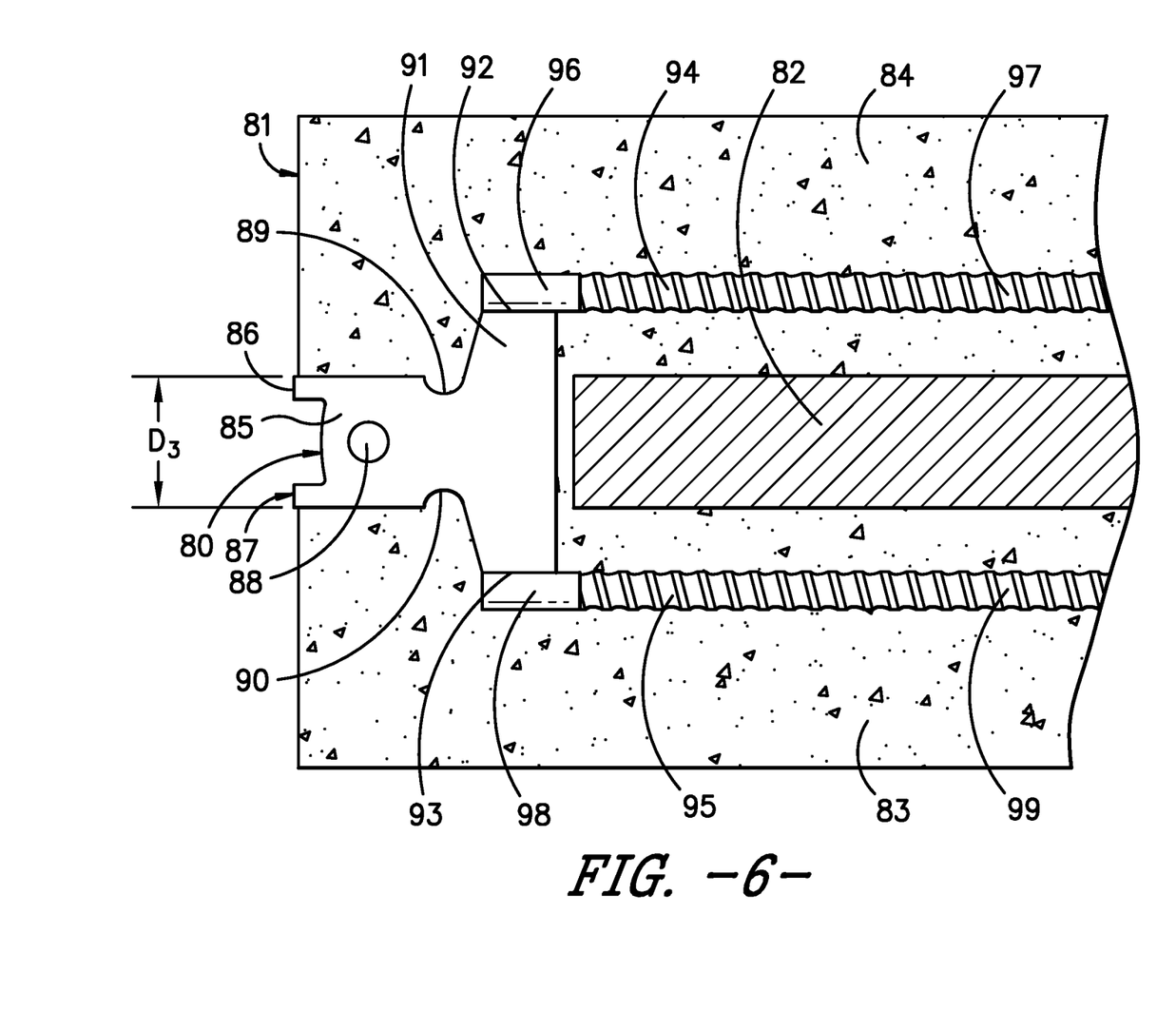
FIG. 6 is a side cutaway view of an alternative design of the anchor embedded in a multilayer precast concrete-insulation-concrete panel.

Referring to FIG. 6, an alternative design of the anchor of the present invention and its use in a precast, multilayer, concrete-insulation-concrete panel is illustrated. Anchor 80 is embedded in panel 81 having insulation layer 82 forming the core of the panel. Concrete layers 83 and 84 are positioned on either side of insulation layer 82, and may even wrap around the end to completely envelop insulation layer 82.

Anchor 80 has head 85, with ears 86 and 87 extending outward, which function similarly to ears 3 and 4 of anchor 1 in FIG. 1. Head 85 has hole 88 for engaging a lifting connector. Recesses 89 and 90 are provided for optionally engaging a shear bar or a utility lift anchor (not shown), as previously described and illustrated herein. The bottom 91 of head 85 flares outward to a width greater than the thickness of insulation core 82. Bottom 91 has sides 92 and 93, where legs 94 and 95 are affixed, for example, by welding. Leg 94 has upper end 96 affixed to head 85 and lower end 97, which is threaded, as described with regard to anchor 1. Similarly, leg 95 has upper end 98 affixed to head 85 and lower end 99, which is threaded.

The distance between sides 92 and 93 of bottom 91 of head 85 is selected to orient legs 94 and 95 within concrete layers 83 and 84, respectively, while providing the required minimum edge distance between the legs and (i) the faces of panel 81 and (ii) insulation core 82. In various embodiments of the invention, the distance between sides 92 and 93 is 25% or more, 50% or more, or even 75% or more than the outer distance between ears 86 and 87, shown as $D_3$ in FIG. 6. An advantage of the anchor 80, in particular when used in a multilayer panel having an insulation core, is that legs 94 and 95 can be provided straight, i.e. no bending or shaping of the threaded portion of the legs is required.

In addition to precast concrete panels and insulated core concrete panels, the erection anchor of the present invention may be embedded in other precast structures, such as double tees, columns, floors, beams, girders, slabs, bridges, walkways, steps, retaining walls, culverts, troughs, catch basins and concrete barriers.

There are, of course, many alternative embodiments and modifications, which are intended to be included within the following claims.

What I claim is:
1. An erection anchor for a concrete component, comprising:
   (a) a head having a top, a first side and a second side, and a hole extending through the head, adjacent the top;
   (b) a first leg having an upper end connected to the first side of the head and a lower end extending downward from the head, wherein the lower end of the first leg is threaded along a length of 6 inches or greater;
   (c) a second leg having an upper end connected to the second side of the head and a lower end extending downward from the head, wherein the lower end of the second leg is threaded along a length of 6 inches or greater; and
   (d) wherein the threads along the first and second legs are coil threads having a pitch of from 7 mm to 30 mm and a threadform characterized by adjacent crests and a concave arc extending between the adjacent crests.
2. The erection anchor of claim 1, wherein the head, first leg and second leg lie in the same plane, and the upper end of the first leg is welded to the first side of the head, and the upper end of the second leg is welded to the second side of the head.

3. The erection anchor of claim 1, wherein the threads of the first leg and the second leg are characterized by a pitch of from 10 mm to 20 mm.

4. The erection anchor of claim 3, wherein the threads of the first leg and second leg are characterized by a major diameter which is from 5 to 30% greater than a minor diameter.

5. The anchor of claim 1, wherein the threads of the first leg and the second leg are rolled threads characterized by a radius of from 7 mm to 14 mm.

6. The anchor of claim 3, wherein the threads of the first leg and second leg each extend a distance of 10 inches or greater.

7. A precast concrete component, comprising:
(a) a multilayer panel having an insulation layer sandwiched between a first concrete layer and a second concrete layer;
(b) an erection anchor having (i) a head with a top, a first side and a second side, and a hole extending through the head, adjacent the top; (ii) a first leg having an upper end connected to the first side of the head and a lower end extending downward from the head, wherein the lower end of the first leg is threaded along a length of 6 inches or greater; and (iii) a second leg having an upper end connected to the second side of the head and a lower end extending downward from the head, wherein the lower end of the second leg is threaded along a length of 6 inches or greater; and (iv) wherein the threads along the first and second legs are coil threads having a pitch of from 7 mm to 30 mm and a threadform characterized by adjacent crests and a concave arc extending between the adjacent crests; and
(c) wherein the anchor is embedded in the panel, with the top of the head and the hole in the head exposed, the lower end of the first leg is embedded in the first concrete layer and the lower end of the second leg is embedded in the second concrete layer.

8. The component of claim 7, wherein the threads of the first leg and the second leg are characterized by a pitch of from 10 mm to 20 mm.

9. The component of claim 7, wherein the threads of the first leg and second leg are characterized by a major diameter which is from 5 to 30% greater than a minor diameter.

10. The component of claim 7, further comprising a shear member affixed to the head of the anchor, wherein the shear member is embedded in either the first concrete layer or the second concrete layer of the panel.

11. The component of claim 7, wherein the distance between the lower end of the first leg and the lower end of the second leg is 33% or more than a distance between the first side of the anchor head and the second side of the anchor head.

12. The component of claim 7, wherein the distance between the lower end of the first leg and the lower end of the second leg is 50% or more than a distance between the first side of the anchor head and the second side of the anchor head.

13. The component of claim 7, wherein the distance between the lower end of the first leg and the lower end of the second leg is 75% or more than a distance between the first side of the anchor head and the second side of the anchor head.

14. The component of claim 7, wherein the head of the anchor further comprises a bottom, and the bottom of the head flares outward relative to the top of the head to a width greater than a thickness of the insulation layer, and the upper end of the first leg is welded to the bottom of the head, and the upper end of the second leg is welded to the bottom of the head, and wherein a distance between the first side where the first leg is attached and the second side of the head where the second leg is attached is 25% or more than a distance across the exposed portion of the top of the head.

15. The component of claim 14, wherein the first and second legs are straight.

16. The component of claim 14, wherein a distance between the first side where the first leg is attached and the second side of the head where the second leg is attached is 50% or more than a distance across the exposed portion of the top of the head.

17. The component of claim 16, wherein the first and second leas are straight.

18. The component of claim 7, wherein the threads of the first leg and the second leg are rolled threads characterized by a radius of from 7 mm to 14 mm.

19. The component of claim 8, wherein the threads of the first leg and second leg each extend a distance of 10 inches or greater.

20. The component of claim 7, wherein an outer surface of the panel is provided with a recess, and the head of the anchor is positioned in the recess.

* * * * *